Feb. 20, 1940. W. WALMSLEY 2,190,814
REFERENCE CABINET
Filed Nov. 22, 1937 3 Sheets-Sheet 3
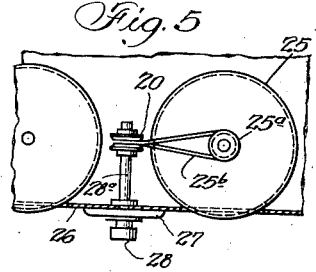
Fig. 5
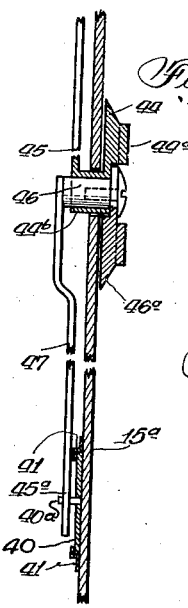
Fig. 6
Fig. 7
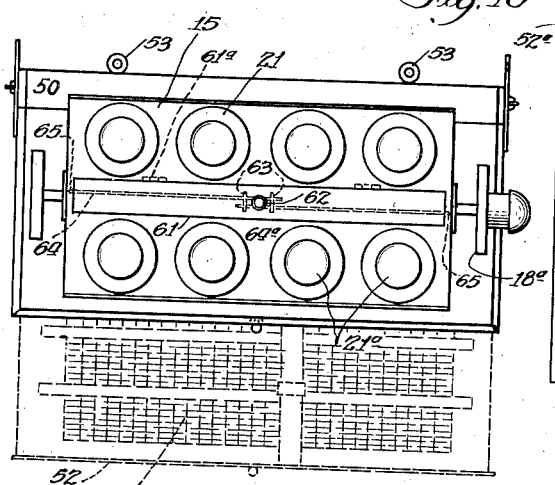
Fig. 8
Fig. 9
Fig. 10
Inventor:
William Walmsley
By: Stevens & Batchelor
Atty's Patented Feb. 20, 1940

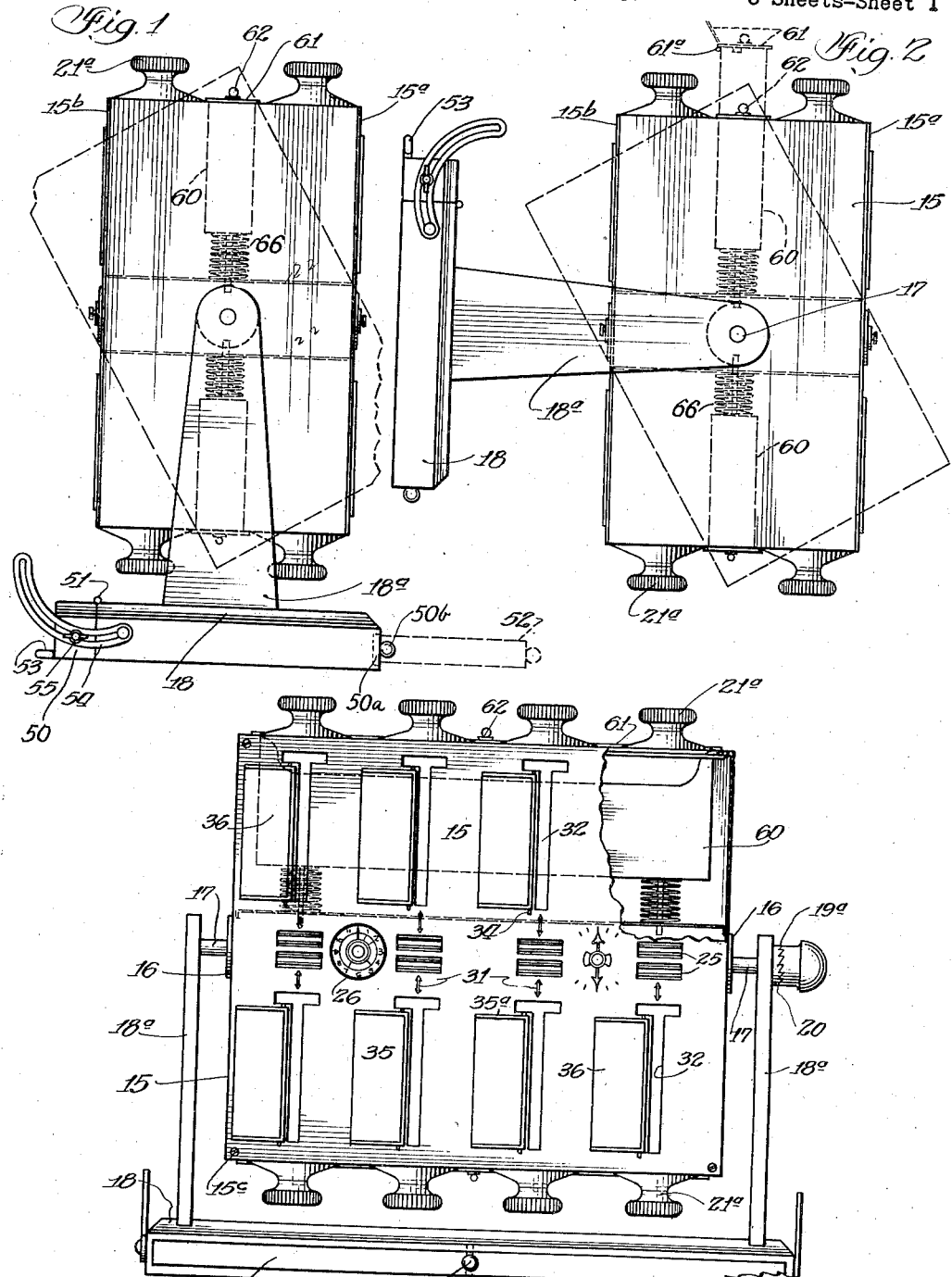
Feb. 20, 1940. W. WALMSLEY 2,190,814
REFERENCE CABINET
Filed Nov. 22, 1937 3 Sheets-Sheet 1
Inventor:
William Walmsley
By Stevens + Batchelor
Atty's

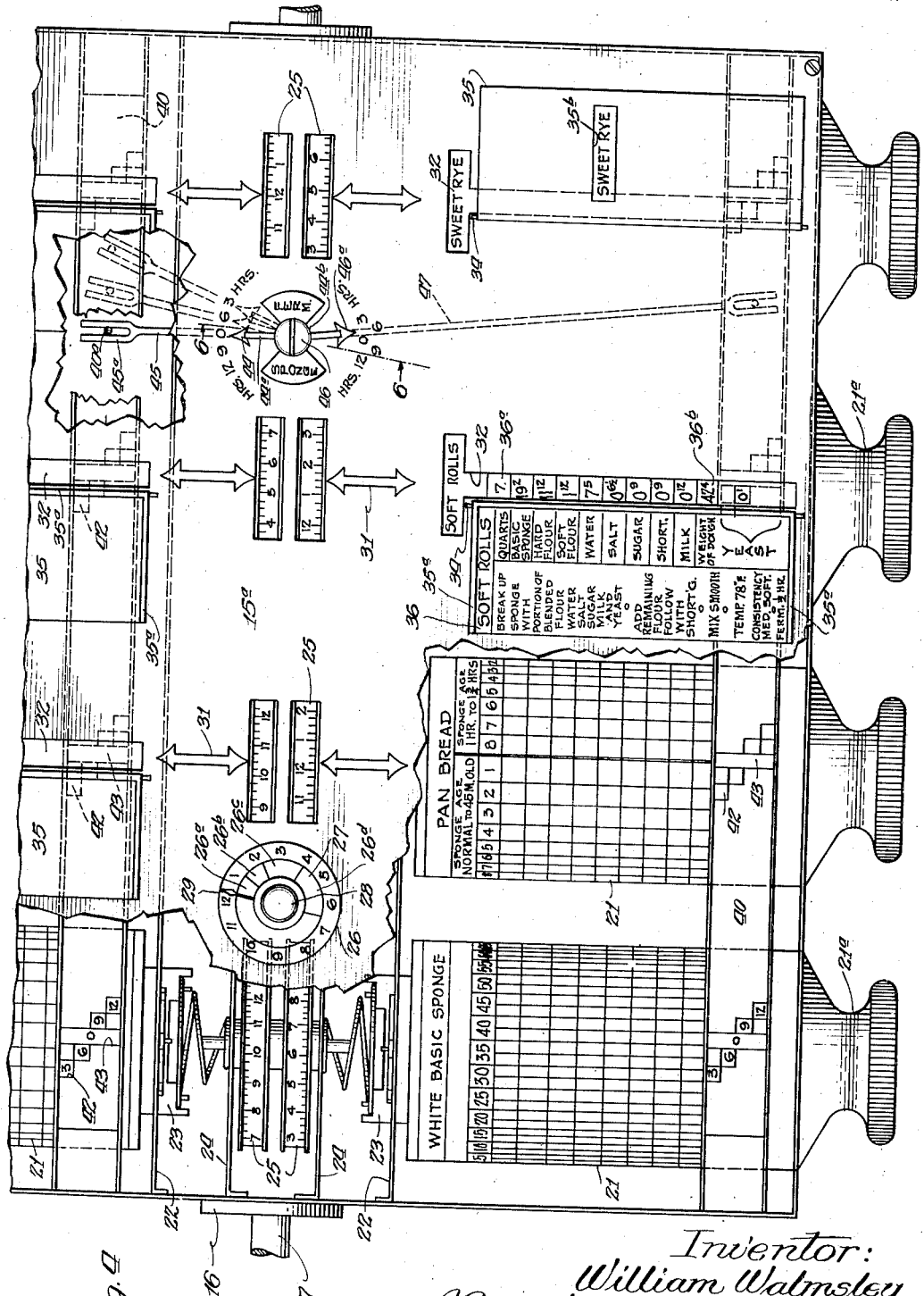

2,190,814

UNITED STATES PATENT OFFICE 2,190,814

REFERENCE CABINET

William Walmsley, Chicago, Ill.

Application November 22, 1937, Serial No. 175,991

20 Claims. (Cl. 35—1)

My invention relates to reference files for materials required in the production of commodities and particularly for ingredients for producing all types of yeast-raised baking doughs, cakes and other chemically leavened baking mixtures, pies, icings, fillings, toppings, etc., and my main object is to provide a cabinet having effective and proven reference means which control, simplify and expedite the task of procuring the proper amount and type of ingredients for a complete variety of bakery products, with effective means for the simple interchangeability of formulas in any mixing sequence whenever required.

A further object of the invention is to provide a reference cabinet with means which accurately specify the kind and amounts of the necessary ingredients required for a desired "size" as a measure or weight of a batch or mixture, covering a complete variety of baking formulas and eliminating excessive under and over production in daily shop routine.

Another object of the invention and one of particular importance is to provide effective means for the successful application of one or more types of fundamental or basic sponges any of which may contain patent flour, whole wheat flour or rye flour, each special type of sponge being suitable for the production of a variety of yeast-raised products, and each basic sponge and variety baking doughs therefrom being of the desired weight or "batch size" to cover daily fluctuations in orders.

A further object of the invention is to include in the novel cabinet a peculiar master timing mechanism operable in conjunction with independently operated timing discs, the master timer automatically controlling the correct division of each baking dough variety formulas employing a basic sponge dough.

An additional object of the invention is to incorporate in the cabinet a novel perforated sliding mechanism which automatically indicates the amount of yeast necessary for each variety of baking dough in conjunction with the desired fermentation period of the basic sponge used, the peculiar design of the slide also permitting its being used for other types of baking formulas or mixtures.

Another object of the invention is to provide means in the novel cabinet for readily determining the amounts of the ingredients required in relation to any predetermined amount of fermented basic sponge for the various yeast-raised baking dough formulas used.

An additional object of the invention is to incorporate in the novel cabinet other means whereby the complete formula for the total amount of basic sponge required by the various product formulas is readily determined.

Still another object of the invention is to provide means in the novel cabinet for speedily and accurately calculating the total material cost of a "batch" or mixture.

With the above objects in view, and any others which may suggest themselves from the description to follow, a better understanding of the invention may be had by reference to the accompanying drawings, in which—

Fig. 1 is an end view of the novel reference cabinet as adapted for support on a horizontal object, such as a table or work bench;

Fig. 2 is a similar view showing the cabinet as adapted for support from a vertical surface, such as the face of a wall or post;

Fig. 3 is a front elevation of the cabinet partly broken away;

Fig. 4 is an enlarged elevation of a portion of the cabinet broken away to expose the interior;

Fig. 5 is a plan view of a detail;

Fig. 6 is a section on the line 6—6 of Fig. 4;

Figs. 7 and 8 are plan views of example charts employed in the novel cabinet;

Fig. 9 is a plan view showing a computing unit; and

Fig. 10 is a plan view showing the computing unit in greater detail.

In the baking industry, various formulas are employed for reference when preparing sponge doughs, straight doughs, other types of yeast-raised doughs and other baking mixtures. One system of reference may employ a large frame or cabinet bearing the entire array of formulas without distinction as to importance or frequency of use. It is apparent that a reference system of this type creates frequent opportunities for confusion and error in such items as ingredients and their weights, resulting in spoiled mixes and non-uniform or unsalable products. Another method of filing formulas is by impaling them on a desk spindle or hook, or tying them together with a string and suspending them from a hook, or by a card system or in a book. Obviously, much time may be lost in an attempt to find the proper formula by these systems, not to speak of chances to make errors and the inevitable soiling or tearing of the sheets or cards so that they quickly become unfit for use. A still further method involves daily repetition in copying identical kinds and amounts of ingredients for individual mixtures and is costly because much time may be unnecessarily devoted daily to copying reference items. It is obvious that should the same formula be used several times during the day's work copying the names, weight or amounts of ingredients of mixtures is unnecessary repetition, consumes valuable time, creates confusion, and invites frequent error. It has therefore been my intention to eliminate the above difficulties by the provision of a file cabinet which minimizes complications, hazards and efforts incident to the selection and placement of formulas and also the filing of unwanted formulas in the baking industry or in fields dealing with corresponding conditions.

In contemplating a unit for a formula file, a cylinder or roll bearing the formula in relation to a master card for a given product appears to be the most efficient expedient. Thus, with values stepped off along the periphery of the cylinder, the rotary adjustment of the latter in relation to the master card will present the successive values in positions adjacent to the card and so facilitate the reading or selection of such values.

In accordance with the foregoing, specific reference to the drawings indicates the novel file cabinet at 15, the same having front and back walls 15a and 15b which are secured to the stock of the cabinet by screws 15c. The end walls of the cabinet have center plates 16, outwardly extended with trunnions 17, which are journaled in the end brackets 18a of a stand 18. This stand may be set on a table or other horizontal surface to support the cabinet as indicated in Fig. 1; or, it may be positioned horizontally as in Fig. 2 for attachment to a wall or post, where a table or other horizontal object is not readily available. Thus, the cabinet is capable of rotation as indicated by dotted lines in Figs. 1 and 2, and its position at any angle may be controlled by a spring knob having a tooth formation 19a cooperative with a disk 20 carried by one of the stand brackets 18a, so that the cabinet may be fixed at any desired position for easy reference or reading. Reasons for rendering the cabinet rotatable are to use both faces of the cabinet and to make either the wall 15a or 15b accessible from the front; by tilting the cabinet to the position indicated by lines in Figs. 1 and 2, access is had for the handy removal or insertion of the cylindrical units contained in the cabinet by way of the top and bottom thereof.

The units just referred to comprise a set of cylinders 21 which occupy vertical positions in the cabinet when the latter is in normal or upright position. While any number of cylinders may be employed, the present illustrations show eight on each side of the cabinet, in two vertically-spaced rows of four each. Each of the cylinders is positioned between the top or bottom of the cabinet and inner partitions 22, and is designed for insertion or removal by way of a full-sized opening in said top or bottom for each cylinder. The cylinders have outwardly projecting knobs 21a by means of which they are removed or inserted, and a mechanism located at 23 serves to retain or release each cylinder relative to the cabinet, such mechanism being described in more detail in my Patent No. 2,148,092 on Reference device, dated February 21, 1939. It will thus be apparent to one approaching the cabinet from one side, or commonly from the front, that the insertion or removal of one or another of the cylinders 21 is made handier by swinging the cabinet to the dotted-line position of Figs. 1 and 2.

The cabinet also has a pair of horizontal partitions 24 in a medial zone, and between these are rotatably disposed horizontal circular disks 25 in vertically-spaced pairs, each disk being independently rotatable and bearing on its periphery a linear progressive scale starting with 1 and ending with 12, the figures on the scale representing clock time. The disks 25 are disposed co-axially with the particular cylinders above and below the same, each disk being independently rotatable and having a relation to the cylinder opposite the same, as indicated by the arrows 31.

Spaced from the center of the cabinet the walls 15a and 15b each display a clock dial 26 having a central disk 27 with a projecting knob 28. The disk is divided with a succession of sector-shaped sections 26a, 26b, 26c, 26d etc., and each of these has a different color. The section 26a has a projecting hand or pointer 29 operable relative to the clock dial 26 when the knob 28 is turned. The knob 28, disk 27, and pointer 29 are rotatable as a unit and have a connection illustrated in Fig. 5 with one of the lower disks 25 immediately to the right of the clock dial. It is seen that the knob 28 has an inwardly directed spindle 28a carrying a pulley 20. The adjacent disk 25 also has a pulley 25a from which a belt 25b extends to the pulley 20 at an even ratio, so that the rotation of the particular disk will be duplicated by that of the pointer 29 at the same rate; also, the connection is such that the numbers on the disk will occur in relation to the frontal arrow or indicating legend 31 on the cabinet as the pointer 29 meets corresponding numbers on the dial 26. It is understood that only one disk 25 is so connected to the pointer or master timer 29 on each face of the cabinet and that all the other disks are free to rotate independently. Also, the gearing between the parts mentioned is shown merely as a matter of example, and any other type of gearing which will procure the proper operative connection may be employed.

The front and back walls of the cabinet are each perforated with a long vertical T-shaped slot 32 opposite the center of each cylinder 21, the slots in the back wall necessarily having an inverted position, but appearing upright when the cabinet is rotated to change sides or be read from the front. Adjacent to each slot 32 a vertical wire 34 extends spacedly from the wall and forms a pintle for a sheet metal shutter 35, whereby to enable the latter to be in the open position indicated by full lines in Fig. 3, or to be swung to close the slot 32 as shown in the lower portion of Fig. 4 at the right. When open, each shutter 35 reveals channel flanges 35a for the insertion of a card 36; and the center of the shutter has a cross-slot 35b to expose the corresponding portion of the back of the card 36 when the shutter is closed. The operation of the shutters is more fully described in my Patent No. 2,093,530, issued September 21, 1937.

As the novel file cabinet is for the reference and aid of workmen in baking and similar establishments, the cylinders 21 are designed to carry various proven formulas which may greatly facilitate the preparation and proper content of baking doughs, baking mixtures and the like. Thus, Fig. 4 shows a specimen cylinder covered with a wrapper entitled "Pan bread". The method of applying and fastening this wrapper to the cylinder is treated in detail in my allowed patent application Serial No. 128,880, filed March 3, 1937.

The formula on this wrapper employs a predetermined amount of sponge as a basic ingredient, and is stepped off laterally in divisions according to the extent of the time period of fermentation or the "age" of the basic sponge when the same is employed for the mixing of a product dough. Thus, each principal division of the formula relates to the fermentation period or age of the basic sponge when used. The first main division of the formula is consulted when the basic sponge is of normal age or properly conditioned to 45 minutes old or over-fermented. The second main division of the formula shows the age of the sponge to be from one hour to one and three quarters hours over-fermented and so on. For facility in distinction, each main division is of a different color, the first being white, the second being green, the third being red, and so on.

The card 36 lists the ingredients for the formulas carried by each of the cylinders. Thus, an ingredient card for a typical formula cylinder is illustrated in the center of Fig. 4. The readings on the cylinder indicate the amounts of ingredients required for a given quantity of product dough or mixture. The age of the basic sponge when used directly controls the weight of sponge, flour, water and yeast necessary for mixing the particular product dough or mixture. The remaining ingredients for the dough, such as salt, sugar, shortening and so on, remain constant regardless of the age of the sponge when used. Therefore, in order to procure the proper formula, the worker must know the approximate age of the basic sponge when used and turn the cylinder to the corresponding color as viewed through the slot 32, the desired colored division of the formula being readily determined by reference to the clock dial indicator 26 and disk 25, as will presently be described. By locating the number of "quarts" of mixture required—see 36a, Fig. 4—as shown at the top of the ingredient card 36 in the main division which is required for the product dough, the tabulations in the column below will tell exactly how much of each ingredient is necessary for the desired dough. Should pounds of dough be used for calculation instead of "quarts" the same procedure is followed, only that the dough batch or weight requirement is found by reference to the bottom of the ingredient card 36 (see 36b) and the required materials for the dough are located in the same column immediately above.

Three major requirements occur daily in the production department of a conventional baking establishment. First, the variety of products to be baked that day, second, how many units of each variety are required, and third, the mixing sequence so as to supply the baked products to the trade when wanted or customary. With an array of ingredient cards exposed in front of the product cylinders 21, it is likely that mistakes will occur from time to time by the use of formulas from the wrong cylinders. As noted, the ingredient cards 36 bear on their front faces a top reading of the product they represent. Thus, to avoid error of choice, only those cards are left open or exposed each day as represent products then wanted, the others being swung closed. In this connection, the backs of the ingredient cards which are closed will bear their product names for display through the openings 35b, so that only the name of the product will appear for purposes of identification. Ordinarily, an ingredient card relates to a simple product formula on the adjacent cylinder sheet. However, in case a cylinder is provided with two or three product formulas in rotary sequence, it follows that one or two additional ingredient lists must be provided for the same shutter. This can easily be done by printing a single additional card with the extra formulas—if two are added—on both sides and simply hanging or mounting the new card over the old one by means of hooks or clips from either side of the card over the shutter, making it easy to expose that ingredient list which relates to the particular product formula selected.

The arrangement in the center of the novel cabinet facilitates the location of the desired color or main divisions of the various charts by the worker in accordance with the plan of his daily routine. For example, his orders may be to prepare a pan bread dough at 12:15 p. m., a soft roll dough at 1:30 p. m. and a sweet rye dough at 4:45 p. m. It should be assumed that he has prepared or "set" a six-hour white basic sponge beforehand, such as at 6:15 a. m. Having received the above instructions, he sets the disks 25 corresponding to the cylinders 21 of the products named to the clock time required when each dough is to be mixed. Thus, the disk opposite the pan bread cylinder is set at 12:15, the one opposite the soft rolls cylinder at 1:30 and the disk for the sweet rye is set at 4:45, as shown in Fig. 4. However, by setting the pan bread disk, the gearing previously described sets the pointer 29 to the same hour on the dial 26, namely 12:15. The original settings of the disks 25 are made when the workman receives the order, so that he may not forget later in the day what mixing hours were specified for each product dough in the order; and, when he consults a disk 25 for the particular mixing hour, he need only refer to the same hour on the control dial 26 to determine the color of the chart division he is to look for on the particular product-cylinder. In other words, the desired color for all doughs will appear opposite the particular hour on the dial, relieving the workman of any calculation or uncertainty. Observing the color on the master control 26 he need only turn the corresponding knob 21a to bring the desired color of the formula chart to the front and isolate the particular formula of the color range in the narrow limits of the slot 32 in accordance with the product quantity as quarts or pounds of mixed dough required, as previously mentioned.

The amount of mixed dough for any given product is usually not furnished in the shop order to the workmen. He is simply told how many loaves of one or another type of bread are wanted or how many dozen-units of rolls or similar product are to be produced. I have therefore provided a cylinder unit similar to that just described for product doughs, and whose chart—with its master card at the left—appears in Fig. 7. To read this chart in relation to its master card, let it be assumed that the desired product is soft rolls, and that the known scaling weight of the dough for a dozen-unit is 15 oz. The order calls for fifteen units or dozen. To determine the amount of dough required, the workman turns the cylinder to the scaling weight number 15 and notes the figure in the corresponding column which is horizontally opposite the master card number 15, which represents the number of units required. The resulting figure is 14 lbs. and 1 oz. Thus, with the scaling weight for specified units always known by the workman, the amount of dough required may easily be determined from the above chart; or, if so desired a similar chart in which fermentation loss is included in the calculations can be used.

One of the cylinder units 21 may also have a reference for the preparation of a basic sponge for the production of variety doughs, as shown in Fig. 4. It is essential that the proper formula be used in accordance with the amount of sponge wanted. For this purpose, the cylinder and ingredient card may be made with a general division above and a "yeast" division below, as indicated in Fig. 8.

It is seen that the required amount of fermented basic sponge is listed from 5 lbs. up in lateral order in the upper part of the chart. The ingredients for the sponge are carried by the card at the left and by turning the cylinder 21 to the amount or weight of sponge required the workman quickly determines the quantitative ingredient combination in the column below for the total amount of fermented sponge required.

As in the case of the sponge chart of Fig. 8, "yeast" units are also carried by the other cylinder charts. Such yeast units govern the fermentation or conditioning period of the basic sponge and also of each variety of dough. Thus, by varying the amounts of yeast in a sponge and keeping other conditions constant, a sponge can be regulated to assume the proper condition in any desired period of time. The smaller the amount of yeast used the longer will be the fermentation or conditioning period of the sponge or baking dough, whereas, the larger the amount of yeast used the shorter will be the fermentation period.

In conventional shop practice I have found that periods of three to twelve hours cover the common range of time allowed for sponges to ferment or condition. To accommodate this time range I have chosen the sponge fermentation periods of 3—6—9 and 12 hours respectively as being the most desirable fermentation time periods commensurate with the various demands of the trade. A short time sponge such as one which has undergone a three-hour fermentation period—requires a lesser amount of yeast in the final dough stage than one which has fermented twelve hours. The rate of sponge fermentation particularly that of a basic sponge, is controlled by using a suitable amount of yeast, as shown in the lower part of Fig. 8. Since I have calculated the amounts of yeast necessary in my various product formulas to coincide with the age of the sponge at the time all the dough formula ingredients are combined, I go a step further by providing means for clearly indicating the amounts in any dough formula as long as the sponge age is known. Thus, I provide slides 40 in front and rear walls of the cabinet opposite the "yeast" units of the formula cylinders, making the slides horizontally operable in suitable guides 41, as indicated in Fig. 6.

Each slide 40 is perforated opposite the formula cylinders with a set of square openings 42 in cascade formation except for an intermediate vertical opening 43. The openings 42 are in steps according to the rows in the "yeast" units, and when the slide is moved in either direction the openings register in succession with the corresponding T-slot 32. Thus, the openings 42 expose but a single figure at a time in the "yeast" unit of the chart column. The vertical opening 43 is provided for a full exposure of the column in case a formula has no "yeast" unit, like for cake, pie etc., the slide having no function in such event.

The slide 40 is so designed that the formula figures successively exposed represent progressive sponge age values. A control based on these is shown in Figs. 4 and 6. Thus, in the right center of each cabinet wall is an arcuate scale marked 12—9—0—6—3 to represent sponge fermentation periods in terms of hours. A pointer 44 having a terminal enlargement 44a is pivoted in the cabinet wall to indicate the scale and has its hub 44b extended along the inside of the cabinet with a rising rod 45 terminating with a fork 45a. The latter straddles a pin 40a projecting from the slide and serves to move the latter in accordance with the adjustment of the pointer 44. Thus, with the sponge age known and set by the pointer, the slide will expose the proper yeast values in all the formula charts in the upper row, including the yeast value for the basic sponge. The control is duplicated in the lower row, but conveniently centered in the hub 44b with a stub shaft 46 having its own arrow 46a and actuating rod 47, the arrow being independently operable in relation to the pointer 44. Thus, one control is independent of the other, while both are compactly grouped. By means of the mechanism just described the yeast for the master sponge simultaneously records the yeast for each baking dough. The mechanism conceals unwanted yeast data, thereby preventing confusion and possible errors, and constitutes an important safeguard, since yeast improperly administered will produce undesirable characteristics in the resultant products. While the mechanism described above for operating the perforated slides is the preferred one, any other suitable one may be employed. Thus, each slide may carry its own hand control.

All modern baking establishments are vitally concerned with the various costs involved in production. One important item is the actual cost of materials used in a baking dough or other mixture. In small establishments it is not uncommon to find material cost per batch or mixture unknown because of lack of time and the tiresome task involved in lengthy calculations. To overcome these and other obstacles I have included a cost finding chart with a novel horizontal and vertical sliding mechanism attached in the base of the cabinet as shown more fully in Figs. 3, 9 and 10. Thus, the base 18 of the cabinet stand is formed with a separate back 50 to which it is hinged as indicated at 51. The back is in the nature of a receptacle in which is slidable a board 52 having a chart 52a on its face and suitable means to retain it to the receptacle when fully pulled out. When the cabinet is on a horizontal support, as in Fig. 1, the board or slide 52 may be pulled out horizontally as indicated by dotted lines in the said figure and also in Fig. 9 for the inspection of its chart. However, when the cabinet is mounted on a wall, as in Fig. 2, it is preferable that it be suspended by means of eyes 53 from the back 50 hung on nails driven into the wall. Now, when the chart board 52 is to be withdrawn for inspection, the base 18 and cabinet are swung and raised away from the back 50, so that the base and board are again in a substantially horizontal position. To become fixed in this position, the base 18 carries a slotted quadrant bracket 54 engageable by a thumbscrew 55 carried by the back 50, so that the parts raised may be stationed at any height or angle. When the base 18 is in the vertical position of Fig. 2, the chart board 52 is retained from dropping out by a cross-latch 50a carried by its knob 50b.

The cost chart 52a, illustrated in Fig. 10 carries progressive cost figures per unit of material in lateral sequence, and quantitative values in vertical sequence. A laterally-movable slide 56 has a scale of quantity calibrations in three divisions and a set of secondary slides 57 for the particular divisions, the slide 57 being movable along the slide 56. Thus, with the price of the material per pound known, the scale 56 is slid to the corresponding column of the chart; and with the weight known, the proper slide 57 is set to the corresponding figure on the slide 56. The cost is readily seen in the square where slots 56a and 57a of the affected slides intersect. To illustrate, the cost is to be ascertained for 4 lbs. 7½ oz. of material at 9¢ per lb. The slide 56 is moved to the 9¢ column and the top slide 57 to the figure 4 in the "Pounds" division of the scale 56. The product is .360. The middle slide 57 is now moved to figure 7 of the "Ounces" division, obtaining the product .0394; and the bottom slide 57 is moved to figure ½ of the "Fractional oz." scale, obtaining the product .0028. The three figures are now added thus:

```
        .360
        .0394
        .0028
        -----
        .4022
``` the sum constituting the desired cost.

In order that a variety of product-formula wrappers, ingredient cards, data sheets, etc. may be handily available for purposes of application or replacement to the cabinet cylinders or shutters, I have provided a set of built-in files in the top and bottom of the cabinet and positioned longitudinally between the rows of cylinders. The two files are identical, and each is primarily composed of a box 60 open at the top and preferably recessed in front, as indicated at 60a, in the manner of an index file. The box has a lid 61 hinged at the back, as shown at 61a and with an upstanding knob 62 in the middle. Under the lid the knob carries a gear 63 meshing with racks 64a on opposite sides, the racks forming the inner portions of a pair of longitudinal-extending bolts 64 which pass through slots 65 in the ends of the cabinet in beveled form when the box is sunken therein and compresses two spiral springs 66 under it. In this position the lid is locked and flush with the outside of the cabinet, so that the rotation of the latter will not displace the file. However, when one of the files is to be opened, the cabinet is positioned to locate the file at the top. The partial turn of the knob 62 now withdraws the bolts, allowing the box 60 to be pushed up by the springs 66 to a readily accessible position, the rise of the box inducing the lid to swing open and allow access to the file from above.

It will be evident from the foregoing description that I have provided a reference cabinet of unusual novelty and practicability which takes the routine of guesswork and uncertainty out of baking dough and other baking mixtures and preparations, and which improves the daily shop routine as follows:

1. It simplifies the duty of the workman in calculating his daily shop order requirements, regardless of the dough process or mixtures to be used and variety of products ordered.

2. It prevents errors of spoiled mixtures and thereby effects large savings in costly ingredients.

3. Further savings of materials of great economic importance are effected through eliminating excessive over-production of bakery products usually resulting in "stale goods".

4. It makes possible a practical means for the application of the basic or master sponge system into any number of varieties of yeast raised bakery products. The chief advantages of this dough-product system alone are:

*a.* Saves time.
   *b.* Eliminates "punching" doughs.
   *c.* Lessens confusion in fermentation problems.
   *d.* Permits the production of oven fresh products at convenient sales times.
   *e.* Permits the making of any variety of yeast raised products easily, simply and quickly.

5. It permits a complete change of any type of formulas at any time desired, simply and quickly performed.

6. It enables chronological mixing to suit any requirement.

7. It will successfully handle every type of baking formula or preparation.

8. It provides means for determining the cost of each batch or mix.

9. It provides a compact and efficient appliance by conveniently grouping a relatively large amount of practical information and accessory control means in a space which hardly exceeds a square foot in area.

In conclusion, it is proper to state that while the illustrated examples constitute a practical embodiment of the invention, it is understood that I do not limit myself to the exact details of any of the illustrations used, since it is possible that other or equivalent means might be employed to accomplish the same result, without departing from the scope and spirit of my invention as covered in the appended claims.

I claim:

1. A reference unit comprising a vertical cylinder bearing on its periphery indicia representing numerical values arranged in columns and in rows intersecting the rows, and a slide positioned tangentially of the cylinder and horizontally slidable relative thereto, the slide having openings adapted to register with the column at the point of tangency, and said openings being in a cascading series, whereby to cause single values in succeeding rows to appear through the tangentially-located opening as the slide is moved in steps equal to the widths of the openings.

2. The structure of claim 1, the slide also having an opening in the cascading series vertically extended to simultaneously expose the values in all the rows covered by the slide when the extended opening occupies the tangential position.

3. A reference apparatus comprising a cabinet having front, rear and end walls, trunnions projecting from the end walls, a support including journals for the trunnions to render the cabinet rotatable on a horizontal axis, sets of vertical cylinders close to the inner sides of the front and rear walls respectively, the cylinders being manually rotatable on their axes and bearing reference data units on their peripheries readable in rotary succession, the data on one set of cylinders being inverted relative to that on the other set, and said front and rear walls having vertical slots opposite the proximate portions of the related cylinders to reveal said units singly on the rotation of any cylinder.

4. The structure of claim 3, each unit being distinctively marked, variable time indicators for the cylinders and adapted to receive different time settings, a time dial, and a master indicator with sections adjustable along the time readings on the dial, said sections being marked as the units and indicative thereof in respect to such cylinders whose time indicators have their settings corresponding to the dial readings opposite said sections.

5. The structure of claim 3, the units being in different colors, variable time indicators for the cylinders and adapted to receive different time settings, a time dial and a master indicator with sections adjustable along the time readings on the dial, said sections being colored as the units and indicative thereof in respect to such cylinders whose time indicators have their settings corresponding to the dial readings opposite said sections.

6. The structure of claim 3, each unit being distinctively marked, rotatable time indicating disks located in terminally-spaced relation to the respective cylinders and adapted to display different time settings, a time dial, and a master indicator with sections adjustable along the time readings on the dial, said sections being marked as the units and indicative thereof in respect to such cylinders whose indicating disks have their settings corresponding to the dial readings opposite said sections.

7. The structure of claim 3, each unit being distinctively marked, rotatable time indicating disks located in terminally-spaced relation to the respective cylinders and adapted to display different time settings, a time dial, and a master indicator with sections adjustable along the time readings on the dial, said sections being marked as the units and indicative thereof in respect to such cylinders whose indicating disks have their settings corresponding to the dial readings opposite said sections, and a gearing to rotate one of said disks in accord with the adjusting movement of the master indicator.

8. The structure of claim 3, each unit being distinctively marked, rotatable time indicating disks located in terminally-spaced relation to the respective cylinders and adapted to display different time settings, a time dial, and a master indicator with sections adjustable along the time readings on the dial, said sections being marked as the units and indicative thereof in respect to such cylinders whose indicating disks have their settings corresponding to the dial readings opposite said sections, the dial being circular and the adjustment of the sections rotary in respect to the dial, and a gearing to rotate one of said disks at the speed of the sections.

9. The structure of claim 3, each unit being distinctively marked, rotatable time indicating disks located in terminally-spaced relation to the respective cylinders and adapted to display different time settings, a time dial, and a master indicator with sections adjustable along the time readings on the dial, said sections being marked as the units and indicative thereof in respect to such cylinders whose indicating disks have their settings corresponding to the dial readings opposite said sections, the dial being circular and the adjustment of the sections rotary in respect to the dial, and an operative connection between the master indicator and one of the disks to operate the same at the speed of the sections.

10. A reference apparatus comprising a cabinet, a row of vertical cylinders laterally aranged along the inner side of one cabinet wall, the cylinders being rotatable on their axes and bearing reference data units on their peripheries readable in rotary succession, said wall having vertical slots opposite the proximate portions of the cylinders to reveal said units singly on the rotation of any cylinder, the cylinder peripheries being formed with vertically-divided sections, and means movable in respect to similarly-positioned sections to reveal only certain portions in the parts thereof which appear through said slots.

11. A reference apparatus comprising a cabinet, a row of vertical cylinders laterally arranged along the inner side of one cabinet wall, the cylinders being rotatable on their axes and bearing reference data units on their peripheries readable in rotary succession, said wall having vertical slots opposite the proximate portions of the cylinders to reveal said units singly on the rotation of any cylinder, the cylinder peripheries being formed with vertically-divided sections containing further sub-divisions, and means movable in respect to similarly-positioned sections to reveal only certain ones of the sub-divisions appearing through the slots.

12. A reference apparatus comprising a cabinet, a row of vertical cylinders laterally arranged along the inner side of one cabinet wall, the cylinders being rotatable on their axes and bearing reference data units on their peripheries readable in rotary succession, said wall having vertical slots opposite the proximate portions of the cylinders to reveal said units singly on the rotation of any cylinder, the cylinder peripheries being formed with vertically-divided sections containing further sub-divisions, and means movable in respect to similarly-positioned sections to reveal only certain ones of the subdivisions appearing through the slots, said means comprising a slide operable along said similarly-positioned sections and formed with openings at the points where the selected sub-divisions are to appear.

13. A reference apparatus comprising a cabinet, a row of vertical cylinders laterally arranged along the inner side of one cabinet wall, the cylinders being rotatable on their axes and bearing reference data units on their peripheries readable in rotary succession, said wall having vertical slots opposite the proximate portions of the cylinders to reveal said units singly on the rotation of any cylinder, the cylinder peripheries being formed with vertically-divided sections containing further sub-divisions, and means movable in respect to similarly-positioned sections to reveal only certain ones of the sub-divisions appearing through the slots, said means comprising a slide operable along said similarly-positioned sections and formed with openings the width of said slots and in sets cascaded at the sub-division levels.

14. A reference apparatus comprising a cabinet, a row of vertical cylinders laterally arranged along the inner side of one cabinet wall, the cylinders being rotatable on their axes and bearing reference data units on their peripheries readable in rotary succession, said wall having vertical slots opposite the proximate portions of the cylinders to reveal said units singly on the rotation of any cylinder, the cylinder peripheries being formed with vertically-divided sections containing further sub-divisions, and means movable in respect to similarly-positioned sections to reveal only certain ones from the sub-divisions appearing through the slots, said means comprising a slide operable along said similarly-positioned sections and formed with openings the width of said slots and in sets cascaded at the sub-division levels, a medial opening being the height of the sections.

15. A reference apparatus comprising a cabinet, a row of vertical cylinders laterally arranged along the inner side of one cabinet wall, the cylinders being rotatable on their axes and bearing reference data units on their peripheries readable in rotary succession, said wall having vertical slots opposite the proximate portions of the cylinders to reveal said units singly on the rotation of any cylinder, the cylinder peripheries being formed with vertically-divided sections containing further sub-divisions, and means movable in respect to similarly-positioned sections to reveal only certain ones from the sub-divisions appearing through the slots, said means comprising a slide operable along said similarly-positioned sections and formed with openings the width of said slots and in sets cascaded at the sub-division levels, the slide being movable in steps substantially equal to the widths of said units, and means to indicate the steps in and the extent of the movement of the slide.

16. The structure of claim 10, said means being a slide movable along said wall and formed with openings for said portions, and a control for the slide comprising a pin projecting from the face of the slide, a rotatable knob in said wall, and a fork extended from said knob to straddle said pin and induce the movement of the slide on the rotation of the knob.

17. The structure of claim 10, said means being a slide movable along said wall and formed with openings for said portions, and a control for the slide comprising a pin projecting from the face of the slide, a rotatable knob in said wall, a fork extended from said knob to straddle said pin and induce the movement of the slide on the rotation of the knob, a pointer projected from the knob on the front of said wall, and a scale marked on the latter to indicate the steps in and extent of the movement of the slide.

18. A reference apparatus comprising a cabinet, a row of vertical cylinders laterally arranged along the inner side of one cabinet wall, the cylinders being rotatable on their axes and bearing reference data units on their peripheries readable in rotary succession, said wall having vertical slots opposite the proximate portions of the cylinders to reveal said units singly on the rotation of any cylinder, the cylinder peripheries being formed with vertically-divided sections containing further sub-divisions, and means movable in respect to similarly-positioned sections to reveal only certain ones of the sub-divisions appearing through the slots, said means comprising a slide operable between said wall and said similarly-positioned sections and formed with openings the width of said slots and in sets cascaded at the sub-division levels.

19. A reference apparatus comprising a cabinet, two vertically-spaced rows of vertical cylinders laterally arranged along the inner side of one cabinet wall, the cylinders being rotatable on their axes and bearing reference data units on their peripheries readable in rotary succession, said wall having vertical slots opposite the proximate portions of the cylinders to reveal said units singly on the rotation of any cylinder, the cylinder peripheries being formed with vertically-divided sections, and means in respect to the inner sections to reveal only certain portions in the parts thereof which appear through said slots, said means comprising a slide opposite each set of said inner sections and formed with openings for said portions, and a dual control for the slides comprising a pair of rotary actuators pivoted in the wall and concentrically mounted in respect to each other and means between the actuators and the slides to operate the latter individually.

20. The structure of claim 19, pointers for the actuators directed toward the respective slides, and scale indicia on the wall in the regions of the pointers to indicate the positions in the movements thereof.

WILLIAM WALMSLEY.